US010974618B2

(12) United States Patent
Duprat

(10) Patent No.: US 10,974,618 B2
(45) Date of Patent: Apr. 13, 2021

(54) INSULATING TRACK SEGMENT FOR A GROUND POWER FEEDING SYSTEM AND CORRESPONDING GROUND POWER FEEDING SYSTEM

(71) Applicant: ALSTOM Transport Technologies, Saint-Ouen (FR)

(72) Inventor: Patrick Duprat, Le Raincy (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 63 days.

(21) Appl. No.: 16/402,733

(22) Filed: May 3, 2019

(65) Prior Publication Data

US 2019/0337410 A1    Nov. 7, 2019

(30) Foreign Application Priority Data

May 4, 2018    (FR) ...................................... 1853864

(51) Int. Cl.
| B60M 5/00 | (2006.01) |
| B60M 1/34 | (2006.01) |
| H01B 17/14 | (2006.01) |
| H02G 9/02 | (2006.01) |

(52) U.S. Cl.
CPC ............... *B60M 5/00* (2013.01); *B60M 1/34* (2013.01); *H01B 17/14* (2013.01); *H02G 9/02* (2013.01)

(58) Field of Classification Search
USPC ......................................................... 238/17
See application file for complete search history.

(56) References Cited

U.S. PATENT DOCUMENTS

| 1,964,804 | A | * | 7/1934 | Barnard | ................. | A63H 19/30 |
| | | | | | | 246/454 |
| 3,268,170 | A | * | 8/1966 | Moses | ..................... | E01B 9/685 |
| | | | | | | 238/283 |
| 3,899,825 | A | * | 8/1975 | Hofer | ..................... | B23K 20/08 |
| | | | | | | 228/107 |
| 4,793,545 | A | * | 12/1988 | Raymond | ............... | E01B 1/008 |
| | | | | | | 238/8 |
| 9,868,365 | B2 | * | 1/2018 | Hourtane | ................. | B60M 1/36 |

(Continued)

FOREIGN PATENT DOCUMENTS

| CN | 104 149 661 A | 11/2014 |
| CN | 204 095 572 U | 1/2015 |

(Continued)

OTHER PUBLICATIONS

Anonymous: "Tramway & Light Rail—Welcome to Doshin Rubber", Jul. 18, 2017, XP055541151, Internet Extract: URL: https://web.archive.org/web/20170718142916/https://doshinrubber.com/tramway-light-rail/[extract on Jan. 11, 2019], pp. 1-2, 5, 7,—p. 10.

(Continued)

*Primary Examiner* — William H. Mayo, III
*Assistant Examiner* — Krystal Robinson
(74) *Attorney, Agent, or Firm* — Knobbe, Martens, Olson & Bear, LLP

(57) ABSTRACT

An insulating track segment for a ground power supply system includes a body made of an electric current insulating material. The insulating track segment constitutes a portion of an insulating track for forming a continuous sliding surface for a pad of a vehicle powered by the ground power supply system.

5 Claims, 2 Drawing Sheets

(56) References Cited

U.S. PATENT DOCUMENTS

| | | | | |
|---|---|---|---|---|
| 2003/0183117 A1* | 10/2003 | Morris | ............... | E01B 26/00 |
| | | | | 104/2 |
| 2007/0079724 A1* | 4/2007 | Lohr | ............... | E01B 25/28 |
| | | | | 105/72.2 |
| 2015/0224999 A1* | 8/2015 | Duprat | ............... | B60M 1/34 |
| | | | | 238/14.3 |
| 2018/0141452 A1* | 5/2018 | Hourtane | ............ | B60L 53/32 |

FOREIGN PATENT DOCUMENTS

| | | |
|---|---|---|
| EP | 2907690 A1 | 8/2015 |
| FR | 3017342 A1 | 2/2014 |

OTHER PUBLICATIONS

Anonymous: "Alimentation par le sol—Wikipedia", Apr. 13, 2018, XP055541218, Internet Extract: URL:https://de.wikipedia.org/w/index.php?title=Alimentation_par_le_sol&oldid=176461895 [extract on Jan. 14, 2019], entire document.

Search Report for French Application No. 1853864, dated Jan. 14, 2019 in 2 pages.

* cited by examiner

INSULATING TRACK SEGMENT FOR A GROUND POWER FEEDING SYSTEM AND CORRESPONDING GROUND POWER FEEDING SYSTEM

CROSS-REFERENCE TO RELATED APPLICATIONS

This application claims priority to French Patent Application No. FR 18 53864 filed on May 4, 2018, the disclosure of which including the specification, the drawings, and the claims is hereby incorporated by reference in its entirety.

FIELD OF THE INVENTION

The invention relates to ground power supply systems.

BACKGROUND OF THE INVENTION

The patent FR3017342 describes a ground power supply system for a railway vehicle, comprising a conductive track held by a track support on a concrete base.

The ground power supply system is buried in the roadway so that the conductive track is flush with the surface of the roadway, or protrudes a few centimeters above the surface of the roadway.

The conductive track is subdivided into a plurality of segments, which are installed one after the other on the track support in the direction of the railway.

An insulating element is bonded to the track support between two successive segments of the conductive track to form a discontinuous conductive track.

A railway vehicle, such as a tram, is equipped with two pads which are lowered in order to come into sliding contact with the conductive track. The segments of the track are individually powered with electrical power upon the passage of the tram in order to provide the power necessary for its movement.

A development of a catenary-free power system is to combine the ground power supply solution with an onboard energy solution, allowing the tram to have a certain autonomy.

In this mixed solution, which optimizes the length of the conductive track to be installed, the tram reloads its on-board power source when it is on a part of the track powered via the ground (also called equipped area).

In doing so, the areas of the track crossed independently are devoid of equipment belonging to the power system (also called non-equipped area).

In order to prevent the pads from rubbing on the surface of the roadway when the railway vehicle passes over a non-equipped area, it is necessary to raise the pads according to the following procedure: the tram is stopped before entering the non-equipped area; each pad is raised in order to stop contact with the conductive track; once the pads are raised, the tram passes independently over the non-equipped area; once it reaches a new equipped area, the tram is stopped again; the pads are lowered to come into contact with the conductive track; and, finally, the tram may leave again.

It is thus necessary to lift the pad(s) of the electric vehicle because if it was left in the lowered position, it could rub on different types of surface not provided for this purpose (grass, concrete, asphalt, pavement, etc.). The pad would then experience accelerated degradation and premature aging.

SUMMARY OF THE INVENTION

The invention therefore aims to address this drawback by proposing an improved ground power supply system.

For this purpose, the object of the invention is an insulating track segment for a ground power supply system, characterized in that the segment comprises a body made of an electric current insulating material, wherein the segment constitutes a portion of an insulating track in order to form with a conductive track of the ground power supply system, a continuous sliding surface for a pad of a vehicle powered by the ground power supply system, wherein the body is made of an elastomeric material and incorporates a metal reinforcing plate of the body.

According to particular embodiments, the insulating track segment comprises one or more of the following characteristics, taken separately or in any technically feasible combination:

the body is made of an elastomeric material.
the body is provided with a plurality of inserts which define the sliding surface of the insulating track segment, wherein the inserts have a suitable hardness.
the body is made of an elastomeric material and the inserts are made of ceramic.
the segment incorporates a metal plate reinforcing the body.
the segment has a through-hole designed to receive a suitable fastening system.

The invention also relates to a ground power supply system comprising at least one insulating track segment conforming to the preceding segment.

The insulating track segment of the ground power supply system is anchored directly into a concrete slab buried in the roadway.

Preferably, it is anchored directly in the roadway.

BRIEF DESCRIPTION OF THE DRAWINGS

The invention and its advantages will be better understood upon reading the detailed description which follows of a particular embodiment, given solely by way of non-limiting example, wherein this description is made with reference to the appended drawings, wherein.

DETAILED DESCRIPTION OF THE PREFERRED EMBODIMENTS

Figure 1:
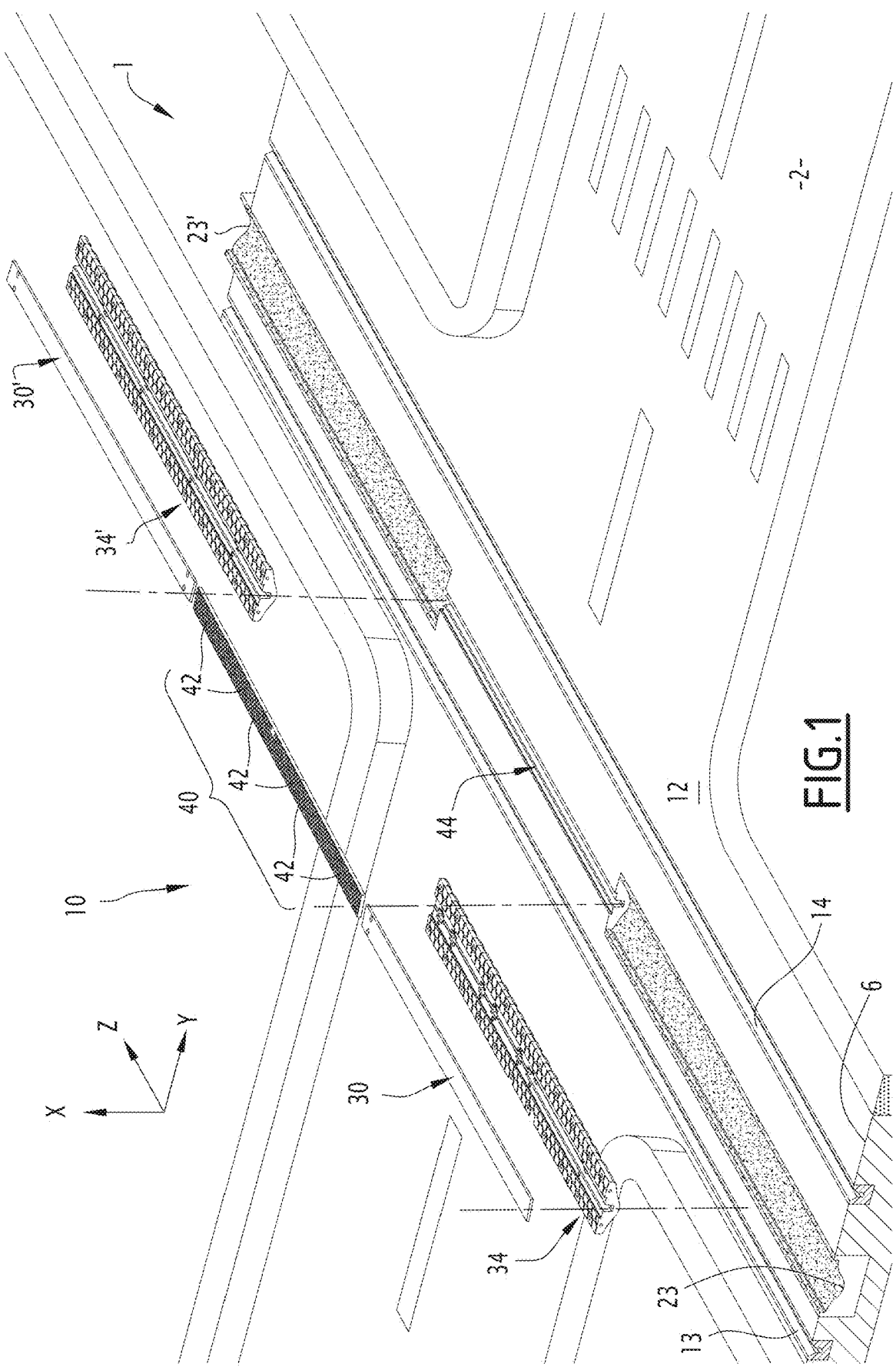
FIG. 1 shows an exploded perspective representation of a ground power supply system according to the invention located at an intersection between a railway and a roadway and, FIG. 2 shows a perspective representation of an insulating track segment of the ground power supply system of FIG. 1, wherein this segment is shown in partial vertical sections.

FIG. 1 shows the intersection 12 between a railway 1 and a roadway 2.

The railway comprises two rails 13 and 14 parallel to each other in a longitudinal direction Z of the railway 1.

The roadway 2 runs in a Y direction, orthogonal to the railway 1. The vertical direction corresponds to the X direction.

The railway 1 is equipped with a ground power supply system 10 to allow movement of a railway vehicle (not shown in the figures), including a tram, by providing the electrical energy it needs.

The system 10 comprises, in particular, a conductive track 30 supplied with electrical power by suitable means.

The conductive track 30 is flush with the surface of the roadway 6.

Each pad equipping the tram slides on the upper surface of the conductive track 30 in order to collect the electric power delivered by the system 10.

In the particular embodiment shown in FIG. 1, the conductive track 30 is held in position by a track support 34, which itself is anchored in a concrete slab 23 that is cast at the bottom of a trench made in the surface of the roadway 6.

In the particular embodiment shown in FIG. 1, the track support 34 is made of an elastomeric material, the upper face of which has a groove to receive the conductive track 30 and whose lower face has a V-shaped concave form to be received in a conjugate form in the upper part of the slab 23.

It should be noted that other types of ground power supply systems are known which differ from the embodiment of FIG. 1 by a different track support. For example, a track support consisting of a section fixed on the concrete base is known. This profile comprises, on its upper face, a groove for receiving the conductive track.

At the intersection 12 itself, the conductive track is interrupted. It therefore has a section of conductive track 30 upstream of the intersection 12 and a section of conductive track 30' downstream of the intersection 12. The downstream section is held by a support 34' anchored in a concrete base 23'. The intersection 12 is therefore a non-equipped area.

According to the invention, in order to avoid having to raise the pad(s) of the tram when crossing the intersection 12, the system 10 comprises an insulating track 40 extending between the sections of conductive track 30 and 30' in order ensure surface continuity for the pad(s) of the tram. The insulating track 40 is so located that the upper surface of the insulating track 40 is at the same level as the upper surface of the conductive track sections 30 and 30', at least at the ends of the sections of conductive track.

The insulating track 40 is made up of a plurality of insulating track segments 42. The segments 42 are arranged one after the other in the Z direction.

Each segment 42 is fixed directly on the surface of the roadway 6.

Each segment 42 is thus advantageously received in a suitable groove 44 formed in the surface of the roadway 6. Each insulating track segment 42 is fixed by fixing means which will be detailed in FIG. 2. The asphalt constituting the surface of the roadway is so arranged on either side of the insulating track 40 that it is flush with the surface of the roadway 6 or protrudes a few millimeters above this surface.

Alternatively, the segments 42 are anchored directly on a planar upper face (or provided with a suitable groove) of the concrete base of the ground power supply system.

Thus, the implementation of the insulating track does not require a track support to fix it.

Figure 2:
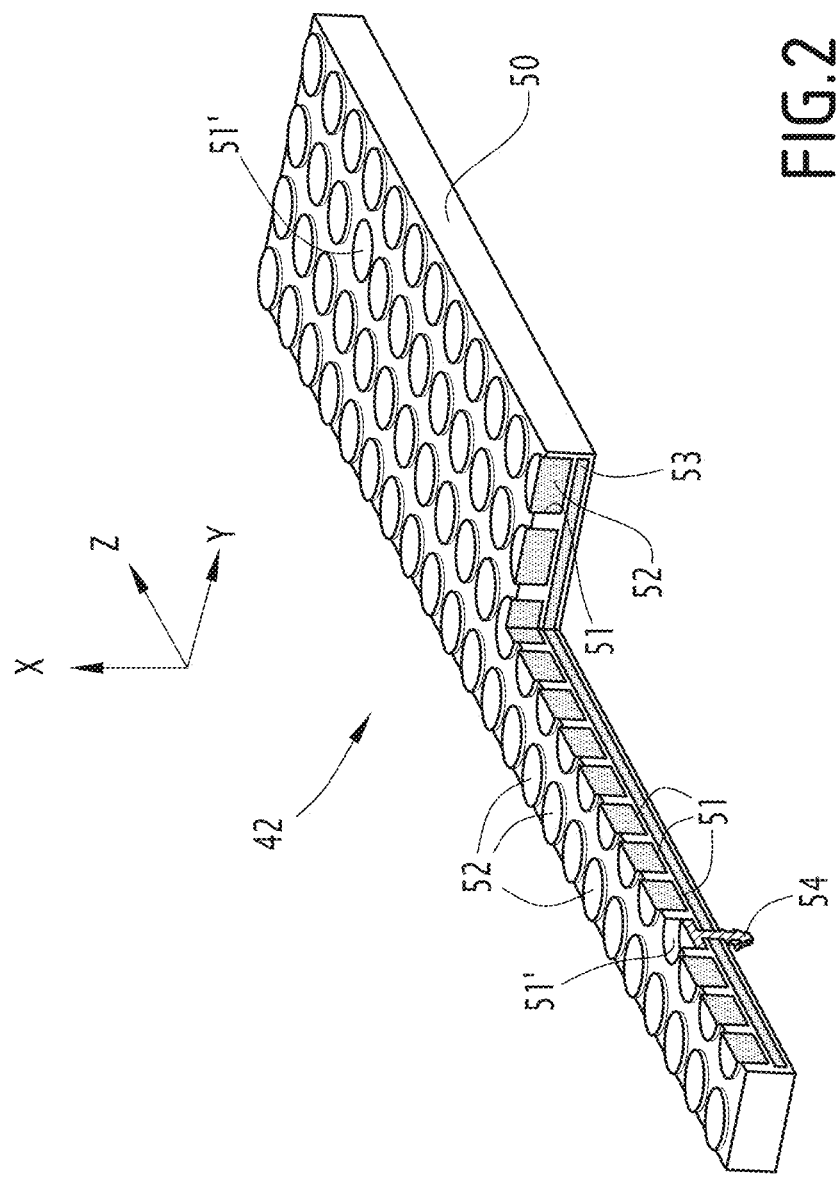

Referring to FIG. 2, an insulating track segment 42 is shown.

It has a parallelepipedic general shape.

It comprises a body 50 made of an electric current insulating material, preferably an elastomer, for example an elastomer of the EPDM (ethylene-propylene-diene monomer) type.

The body 50 has a plurality of blind holes 51. These are arranged to form a pattern, for example a matrix having a plurality of rows and columns extending over the entire upper face of the body 50.

With the exception of two blind holes 51' which are reserved to fix the segment 42, each blind hole 51 receives an insert 52, preferably of cylindrical shape. The insulating track segment described here in details being short (its length is less or equal to 60 cm) two blind holes are reserved for fastening. Alternatively, in particular for longer track segments, a greater number of blind holes might be reserved for fastening.

Each insert 52 has a diameter slightly greater than that of the blind hole 51 which receives it. The insert is then inserted by force into the blind hole, wherein the friction forces are sufficient to provide a good hold. Optionally, the inserts may also be glued.

Each insert 52 has a height greater than the depth of the blind hole 51 which receives it. Thus the inserts 52 protrude above the upper face of the body 50. The upper face of the inserts 52 thus constitutes the upper surface of the insulating track segment 42 over which the pad of the tram slides. For example, the inserts have a diameter of 20 mm and a height of 10 mm. The upper edge of each insert is advantageously beveled in order to avoid impacts with the pad.

The material of the inserts 52 is chosen in order to have a hardness designed to limit wear and allow the sliding of the pad, while withstanding the passage of road vehicles passing over the intersection 12. For example, the inserts 52 may be made of ceramic, for example made of 92% of alumina, which is the electrical insulating material with the best resistance to abrasion.

As shown in FIG. 2, two blind holes 51' are reserved for fixing the insulating track segment 42.

The fixing means are, for example, constituted by a screw 54 and an insulating peg, of which only one screw 54 is visible in FIG. 2.

To allow such anchoring, the elastomeric material of the body 50 of the segment 42 is reinforced by a metal plate 53 extending substantially over the entire length and width of the segment 42. The plate 53 is preferably made of steel (par example S235). This metal plate 53 is embedded in the elastomer material constituting the body 50. It is located below the blind holes for receiving the inserts.

The fact that the insulating track segment 42 is reinforced by a metal plate 53 improves its mechanical strength and allows simple implantation in the roadway.

The bottom of the blind hole 51' is provided with a through-hole passing through the metal plate 53 and the elastomer layers above and below the metal plate 53. The through-hole opens onto the underside of the body 50, which also corresponds to the lower surface of the insulating track segment 42.

The screw 54 is inserted through the through-hole in the peg to become anchored, for example, in the concrete of the base. The head of the screw 54 is received integrally inside the corresponding blind hole 51'.

Those skilled in the art will find that the use of an insulating track to separate two sections of conductive track ensures a continuity of a conducive surface for the sliding pad equipping the electric vehicle. There is therefore no need to implement the complex procedure of lifting the pad at the crossing of an intersection equipped with the system according to the invention.

In addition, the possibility of directly fixing the insulating track in the road or, alternatively, on a concrete base (having a flat upper face or provided with a groove having a simple profile), reduces the length of the power supply track to be installed.

The construction site of such a railway may therefore consist of making the sections upstream and downstream of a section of the track that the tram will cross independently.

What is claimed is:

1. An insulating track segment for a ground power supply system, comprising a body made of an electrical insulating material,
   wherein the insulating track segment constitutes a portion of an insulating track for forming, with a conductive track of the ground power supply system, a continuous sliding surface for a pad of a vehicle powered by the ground power supply system,
   the body is made of an elastomeric material and incorporating a metal reinforcing plate of the body, and
   the body of the insulating track segment is provided with a plurality of inserts defining the sliding surface of the insulating track segment, the inserts being made of ceramic.

2. The segment according to claim 1, wherein the insulating track segment has a through-hole designed to receive a suitable fastening system.

3. A ground power supply system, comprising a power supply and at least one insulating track segment according to claim 1.

4. The ground power supply system according to claim 3, wherein the insulating track segment is anchored directly into a concrete slab buried in a roadway.

5. The ground power supply system according to claim 3, wherein the insulating track segment is anchored directly in a roadway.

* * * * *